US008102827B2

(12) United States Patent
Choi et al.

(10) Patent No.: US 8,102,827 B2
(45) Date of Patent: Jan. 24, 2012

(54) PEER MOBILE ROUTER AUTHENTICATION METHOD, AND MULTIPLE PEER CARE-OF ADDRESSES REGISTRATION METHOD, AND MOBILE ROUTER FAILOVER METHOD FOR MULTI-HOMED MOBILE NETWORKS

(75) Inventors: Nak-Jung Choi, Seoul (KR);
Eun-Kyoung Paik, Uijeongbu-si (KR);
Min-Ji Nam, Seoul (KR); Ji-Ho Ryu,
Seoul (KR); Se-Jun Park, Daejon (KR);
Byung-Soo Chang, Seongnam-si (KR);
Yang-Hee Choi, Seoul (KR)

(73) Assignee: KT Corporation, Sungnam-si (KR)

( * ) Notice: Subject to any disclaimer, the term of this patent is extended or adjusted under 35 U.S.C. 154(b) by 938 days.

(21) Appl. No.: 11/970,466

(22) Filed: Jan. 7, 2008

(65) Prior Publication Data

US 2008/0186930 A1    Aug. 7, 2008

Related U.S. Application Data

(63) Continuation of application No. PCT/KR2006/002485, filed on Jun. 27, 2006.

(30) Foreign Application Priority Data

Jul. 7, 2005    (KR) ........................ 10-2005-0061232

(51) Int. Cl.
*H04W 4/00*        (2009.01)
(52) U.S. Cl. ........................................ 370/338; 370/216
(58) Field of Classification Search .................. None
See application file for complete search history.

(56) References Cited

U.S. PATENT DOCUMENTS 7,284,057 B2 *   10/2007   Kulkarni et al. .............. 709/227
(Continued)

FOREIGN PATENT DOCUMENTS

EP              1578067 A1      9/2005
(Continued)

OTHER PUBLICATIONS

"Mobile IPv6 Extension to Support Nested Mobile Networks", 18th International Conference on Advanced Information Networking and Application, vol. 1, pp. 488-491, 2004.
"Securing Nested Tunnels Optimizations with Access Router Option", http;//ietfreport,isoc.org/idref/draft-ng-nemo-acess-router-option.

(Continued)

*Primary Examiner* — Chi Pham
*Assistant Examiner* — Kouroush Mohebbi
(74) *Attorney, Agent, or Firm* — Knobbe Martens Olson & Bear LLP

(57) ABSTRACT

Provided are a peer MR authentication method, a multiple peer CoAs registration method, a failover method for multi-homed mobile networks, and a computer readable recording medium thereof. The registering method includes the steps of: a) determining whether a second MR is around a first MR; b) at the first MR, transmitting a peer request message to the second MR; c) at the first MR, requesting a HA of the first MR to authenticate the second MR; d) at the HA, transmitting a peer registering request message to the second MR with a prefix of the first MR that transmit the authentication request message to perform RR authentication; and e) at the HA, notifying the authentication result of the second MR to the first MR when receiving a RR authentication result message including the prefix of the first MR to be registered as a peer from the second MR.

12 Claims, 9 Drawing Sheets

U.S. PATENT DOCUMENTS

| | | | | |
|---|---|---|---|---|
| 2004/0095913 A1* | 5/2004 | Westphal | ...................... | 370/338 |
| 2004/0179688 A1* | 9/2004 | Lee | ............................... | 380/270 |
| 2005/0117560 A1* | 6/2005 | Thubert et al. | ................ | 370/349 |
| 2005/0232286 A1* | 10/2005 | Lee et al. | ...................... | 370/401 |
| 2008/0002684 A1* | 1/2008 | Kumazawa et al. | .......... | 370/389 |
| 2008/0107123 A1* | 5/2008 | Rune et al. | ..................... | 370/401 |
| 2008/0198805 A1* | 8/2008 | Weniger et al. | ............... | 370/331 |

FOREIGN PATENT DOCUMENTS

| | | |
|---|---|---|
| JP | 2004-120645 A | 4/2004 |
| KR | 10-2005-0002338 A | 1/2005 |
| KR | 10-2005-0065990 A | 6/2005 |

OTHER PUBLICATIONS

Notice of Allowance issued Feb. 12, 2009 of corresponding Korean Patent Application No. 10-2005-0061232—2 pages.
Search Report dated Jun. 20, 2011 in corresponding EP Application No. 06 76 9062. 8—8 pages.
Seongho Cho et al., "A Dynamic Load Sharing Mechanism in Multihomed Mobile Networks", IEEE International Conference on Seoul, Korea, May 16, 2005, pp. 1459-1463, vol. 3.
Thierry Ernst and Julien Charbon, "Multihoming with NEMO Basic Support", International Conference on Mobile Computing and Ubiquitousnetworking, Jan. 1, 2004, pp. 1-6.

* cited by examiner

PEER MOBILE ROUTER AUTHENTICATION METHOD, AND MULTIPLE PEER CARE-OF ADDRESSES REGISTRATION METHOD, AND MOBILE ROUTER FAILOVER METHOD FOR MULTI-HOMED MOBILE NETWORKS

CROSS-REFERENCE TO RELATED APPLICATION

This application is a continuation application under 35 U.S.C. §365(c) of International Application No. PCT/KR2006/002485, filed Jun. 27, 2006 designating the United States. International Application No. PCT/KR2006/002485 was published in English as WO2007/021074 A1 on Feb. 22, 2007. This application further claims the benefit of the earlier filing dates under 35 U.S.C. §365(b) of Korean Patent Application No. 10-2005-0061232 filed Jul. 7, 2005. This application incorporates herein by reference the International Application No. PCT/KR2006/002485 including the International Publication No. WO2007/021074 A1 and the Korean Patent Application No. 10-2005-0061232 in their entirety.

BACKGROUND

1. Field

The present invention relates to a peer mobile router authentication method, a multiple peer care-of addresses registration method using the same, a mobile router failover method for multi-homed mobile networks, and a computer readable recording medium storing a program for executing the methods.

2. Related Technology

Many scientist and companies expects that the next generation network will be evolved to have an A11-IP structure. Recently, a Wireless Broadband (WiBro) has intermediate characteristics of the wireless LAN and the third generation mobile communication network, and the related services thereof have been provided.

The WiBro aims for providing End-to-End IP communication services in Ubiquitous network environment.

In order to provide seamless wireless Internet access to users under the Ubiquitous network environment, it must support the mobility in the IP layer. As a standard for supporting the mobility, Internet Engineering Task Force (IETF) introduced a mobile IP scheme that supports the mobility in the IP layer. Also, a mobile IPv6 was standardized as Request for Comment (RFC) by applying the mobile IP scheme to IP version 6 (IPv6).

The mobile IPv6 allows a user to communicate with other users while the other users are traveling by assigning a Home Agent (HA), forcing a user to register to the assigned HA, and establishing a communication link between the users through the HA.

Generally, a user wants to access the wireless Internet using a portable terminal while traveling using vehicles such as a bus, a subway or an automobile. If each of users communicates each others using a mobile IP while traveling with vehicles such as a subway, all users must update the location information of own HA. Therefore, large load is generated by updating the location information of HA.

In order to overcome the shortcoming, the IETF formed a NEMO working group for supporting the network mobility and has been standardizing related specifications. The IETF introduced NEMO Basic support scheme. The NEMO Basic support scheme introduces a mobile router (MR) which is a router capable of traveling. In the NEMO Basic support scheme, only mobile router (MR) updates the location information of a Home Agent (HA) when the entire network moves. For example, the MR is installed at a vehicle. When the vehicle is moving, it treats as the entire network is moving, and the only MR updates the location information of the HA.

Multi-homing scheme is generally applied to a host or a network. The multi-homing scheme provides various advantages to a user or a service provider, such as failover, load distribution, and policy routing. The NEMO working group defines not to teach the multi-homing scheme in the NEMO Basic Support scheme but to teach the multi-homing scheme in NEMO Extended Support scheme later. Recently, various analyses have been in progress to apply the multi-homing scheme in the mobile network before introducing the multi-homing scheme.

Hereinafter, a method of registering multiple Care-of Addresses (CoA) will be described at first. Then, a method for authenticating and registering a neighbor mobile router will be described.

According to the mobile IPv6, a mobile node (MN) is allowed to register only one primary Care-of Address (CoA) to a home agent (HA) although a mobile node (MN) is allowed to receive multiple CoAs.

However, in order to supporting seamless mobility, a mobile node (MN) should have more than one network interfaces to access the Internet for failover and network load distribution.

Therefore, a method for registering multiple CoAs was introduced to allow a MN to register more than one CoAs to a HA through expanding the mobile IPv6. When the MN registers a CoA to a HA, a conventional mobile IPv6 adds a home address and a CoA entry to a binding cache if the home address of the MN is not in the binding cache. If the home address of the MN is in the binding cache, a corresponding CoA is updated. That is, the convention binding update (BU) does not allow a MN to use multiple CoAs because a corresponding entry is updated when new BU is performed for the home address of a MN that already register a CoA.

In order to allow the MN to use multiple CoAs, the method of registering multiple CoAs defines a flag M denoting multiple CoAs in a binding update packet. If the M flag is setup, it means that multiple CoAs are used for a home address. Additionally, a binding update mobility option field includes a binding unique identifier sub-option. Through the binding unique identifier sub-option, a binding unique identifier number (BID) is transferred, and the MN can identify each of network interfaces used by each of the CoAs through the BID. Meanwhile, if the M flag is not setup, the MN performs related operations identically to the conventional BU and does not register multiple CoAs.

As described above, the method for registering multiple CoAs allows the MN to register multiple CoAs for one home address to the own HA so as to provide seamless connection and superior service quality (QoS) although the load is distributed according to a pre-give policy or communication difficulty is arisen.

Hereinafter, a method for authenticating and registering a neighbor mobile router (MR) will be described.

In order to perform a failover or distribute loads in a mobile network, various multi-homing schemes allowing one or more routers to provide services were introduced.

When multiple mobile routers are present and one of the mobile routers is malfunctioned, other mobile routers perform the role of the malfunctioned mobile router and help other mobile router having large load.

In order to help other routers to recover or to distribute the large load, it requires that a peering relation between mobile routers is defined through authentication. That is, a MR detects the present of neighbor mobile routers and defines neighbor mobile routers to provide predetermined services instead of the malfunctioned MR or to distribute large load when the MR becomes malfunctioned or has the large load. The reason of authentication is to determine whether neighbor mobile routers have a capability to provide the predetermined service instead of the malfunctioned MR or to confirm whether adjacent mobile routers are corresponding neighbor routers. That is, the authentication checks the capability of adjacent mobile routers to provide the predetermined service instead of the malfunctioned MR or confirms whether adjacent mobile routers are corresponding neighbor routers. After successful authentication, the MR defines the authenticated mobile routers as the neighbor mobile routers.

Such a conventional method of authenticating and registering the neighbor mobile routers was not newly introduced. Return Routability (RR) scheme provided from a conventional mobile IPv6 is used for the authentication between mobile routers. For example, a first mobile router MR1 authenticates a second mobile router MR2 as a neighbor mobile router through a method shown in FIG. 1.

Referring to FIG. 1, the second mobile router MR1 may transmit a router solicitation (RS) message to the first mobile router MR1 to receive a router advertisement (RA) message from the first mobile router MR1.

Afterward, the second mobile router MR2 receives the RA message from the first mobile router MR1 and detects the home address and the CoA of the first mobile router MR1 from the received RA message. Then, the second mobile router MR2 performs the Return Routability (RR) such as RR initialization (HoTI (Home Test Init), CoTI (Care of Test Inti)) and RR response (CoT (Care of Test), HoT (Home Test)) using the home address and the CoA of the first mobile router MR1.

After successful authentication, the first mobile router MR1 registers the second mobile router MR2 to a first home agent HA1 of the first mobile router MR1 as a neighbor mobile router MR. Herein, the first mobile router MR1 transfers the home address, the CoA and the prefix information of the neighbor mobile router, that is, the second mobile router MR2, to the first home agent HA1. Accordingly, the first home agent HA1 has the information about the second mobile router MR2, and the first home agent HA1 uses the second mobile router MR2 when the first mobile router MR1 is malfunctioned.

As one of the multi-homing scenarios, the present invention relates to a method forcing a neighbor mobile router to provide the services of a malfunctioned mobile router in order to provide seamless service when one of mobile routers becomes malfunctioned in the NEMO network formed of multiple mobile routers. In the present invention, the conventional method for registering multiple CoAs, which was introduced for a conventional mobile IPv6 between authenticated mobile routers MR, is expanded to apply the conventional method into the NEMO network.

The foregoing discussion is only to provide the background information, not an admission of prior art.

SUMMARY

One aspect of the present invention provides a method for authenticating a peer mobile router in a multi-homed mobile network formed of multiple mobile routers, a method for registering multiple care of addresses (CoA) for network mobility (NEMO), a mobile router failover method for recovering a mobile router and distributing a load when various difficulties are arisen, such as an external network difficulty, an internal network difficulty, and a mobile router difficulty, and a computer readable recording medium storing a program for executing the methods.

In accordance with one aspect of the present invention, there is provided a method for registering a mobile router (MR) in a multi-homing NEMO network system including multiple mobile routers, the method including the steps of: a) determining whether a second MR that allows a peering relation to a first MR is around a first MR; b) at the first MR, transmitting a peer request message to the second MR for making a peer relation to the second MR; c) at the first MR, requesting a home agent (HA) of the first MR to authenticate the second MR in response to a peer request response from the second MR; d) at the HA, transmitting a peer mobile router registering request message to the second MR with a prefix of the first MR that transmit the authentication request message to perform return routability (RR) authentication; and e) at the HA, notifying the authentication result of the second MR to the first MR when receiving a RR authentication result message including the prefix of the first MR to be registered as a peer from the second MR, where the RR authentication result message is a peer mobile router registering request response message.

The method may further include the step of, at the second MR, adding a forwarding table entry for the HA when the authentication is success.

In accordance another aspect of the present invention, there is provided a method for registering multiple CoAs of a first MR which is authenticated by a method of authenticating a peer mobile router (MR), including the steps of: at the second MR, registering a CoA of the first MR to a home agent of the second MR as one of multiple CoAs using information of the first MR which is a peer router of the second MR, but registering a CoA only for a prefix of the first MR.

In accordance with another aspect of the present invention, there is provided a failover method for failure of a second mobile router (MR) when a CoA of a first MR that is a peer MR is registered to a home agent (HA) of the second MR by a method for registering multiple CoAs, including the steps of: a) transmitting a proxy binding update message from the first MR to a HA of the second MR when the second MR notices the first MR with the failure of the second MR, information of a current failed primary CoA is updated in a binding cache of the HA; b) at the first MR, notifying the second MR that the first MR functions as a proxy and creating a tunnel to the HA; c) providing a service through the created tunnel; d) at the second MR, notifying that the MR2 is recovered from the failure to the HA through a binding update message when the second MR is recovered from the failure, and at the HA, notifying the first MR, which is set as a backup among backup CoAs in a binding cache, that the second MR is recovered through a recovery notify message; and e) deleting a tunnel formed between the first MR and the HA and updating the binding cache of the HA.

In accordance with further another aspect of the present invention, there is provided a recovery method for recovering a second mobile router (MR) from failure when a CoA of a first MR that is a peer to the second MR is registered at a home agent (HA) of the second mobile router by a method of registering multiple CoAs, the recovery method including the steps of: a) updating information about a current failed primary CoA to a binding cache of the home agent HA by transmitting a proxy binding update message to a HA of the second MR from the first MR capable of providing a proxy service if a "ICMP host unreachable" message is returned from the second MR after transmitting a message for a non-exist port to a CoA of the second MR when a RA message is not received from the second; b) at the first MR, forming a tunnel between the first MR to the HA of the second MR; c) providing a service through the formed tunnel; d) at the second MR, notifying the HA through a binding update message that the second MR is recovered from a failure when the second MR is recovered, and, at the HA, notifying the first MR, which is set as backup among backup CoAs in a binding cache, through a recovery notify message that the second MR is recovered from the failure; and e) deleting the formed tunnel between the first MR and the HA, and updating the binding cache of the HA.

In accordance with still another aspect of the present invention, there is provided a computer readable recording medium storing a program for executing a method for registering a mobile router (MR) in a multi-homing NEMO network system including multiple mobile routers, including the functions of: a) determining whether a second MR that allows a peering relation to a first MR is around a first MR; b) at the first MR, transmitting a peer request message to the second MR for making a peer relation to the second MR; c) at the first MR, requesting a home agent (HA) of the first MR to authenticate the second MR in response to a peer request response from the second MR; d) at the HA, transmitting a peer mobile router registering request message to the second MR with a prefix of the first MR that transmit the authentication request message to perform return routability (RR) authentication; and e) at the HA, notifying the authentication result of the second MR to the first MR when receiving a RR authentication result message including the prefix of the first MR to be registered as a peer from the second MR, where the RR authentication result message is a peer mobile router registering request response message.

In accordance with further still another aspect of the present invention there is provided a computer readable recording medium storing a program for executing a method for registering multiple CoAs of a first MR which is authenticated by a method of authenticating a peer mobile router (MR), including the function of: at the second MR, registering a CoA of the first MR to a home agent of the second MR as one of multiple CoAs using information of the first MR which is a peer router of the second MR, but registering a CoA only for a prefix of the first MR.

In accordance with even further still another aspect of the present invention there is provided a computer readable recording medium storing a program for executing a failover method for failure of a second mobile router (MR) when a CoA of a first MR that is a peer MR is registered to a home agent (HA) of the second MR by a method for registering multiple CoAs, comprising the functions of: a) transmitting a proxy binding update message from the first MR to a HA of the second MR when the second MR notices the first MR with the failure of the second MR, information of a current failed primary CoA is updated in a binding cache of the HA; b) at the first MR, notifying the second MR that the first MR functions as a proxy and creating a tunnel to the HA; c) providing a service through the created tunnel; d) at the second MR, notifying that the MR2 is recovered from the failure to the HA through a binding update message when the second MR is recovered from the failure, and at the HA, notifying the first MR, which is set as a backup among backup CoAs in a binding cache, that the second MR is recovered through a recovery notify message; and e) deleting a tunnel formed between the first MR and the HA and updating the binding cache of the HA.

In accordance with eve further still another aspect of the present invention there is provided a computer readable recording medium storing a program for executing a recovery method for recovering a second mobile router (MR) from failure when a CoA of a first MR that is a peer to the second MR is registered at a home agent (HA) of the second mobile router by a method of registering multiple CoAs, including the functions of: a) updating information about a current failed primary CoA to a binding cache of the home agent HA by transmitting a proxy binding update message to a HA of the second MR from the first MR capable of providing a proxy service if a "ICMP host unreachable" message is returned from the second MR after transmitting a message for a non-exist port to a CoA of the second MR when a RA message is not received from the second; b) at the first MR, forming a tunnel between the first MR to the HA of the second MR; c) providing a service through the formed tunnel; d) at the second MR, notifying the HA through a binding update message that the second MR is recovered from a failure when the second MR is recovered, and, at the HA, notifying the first MR, which is set as backup among backup CoAs in a binding cache, through a recovery notify message that the second MR is recovered from the failure; and e) deleting the formed tunnel between the first MR and the HA, and updating the binding cache of the HA.

The present invention can recover a mobile router from various failures and distribute load in a multi-homing network formed of multiple mobile routers by applying a method for authenticating peer mobile routers and a method of registering multiple CoAs for a NEMO network. Also, the present invention stably and effectively supports the multi-homing function by applying the two methods proposed by various policies.

DESCRIPTION OF DRAWINGS

The above and other objects and features of the present invention will become apparent from the following description of the preferred embodiments given in conjunction with the accompanying drawings, in which.

DETAILED DESCRIPTION OF EMBODIMENTS

Other features and aspects of the invention will become apparent from the following description of the embodiments with reference to the accompanying drawings, which is set forth hereinafter.

The present invention relates to an effective NEMO multi-homing supporting scheme using a method of registering multiple CoAs for NEMO network and for detecting and authenticating a peer mobile router. The effective NEMO multi-homing supporting scheme according to the present invention may be divided into three parts, that is, a peer mobile router (PMR) authentication method, a multiple CoAs registration method, and a failover method.

Firstly, a PMR authentication method will be described.

Figure 1:
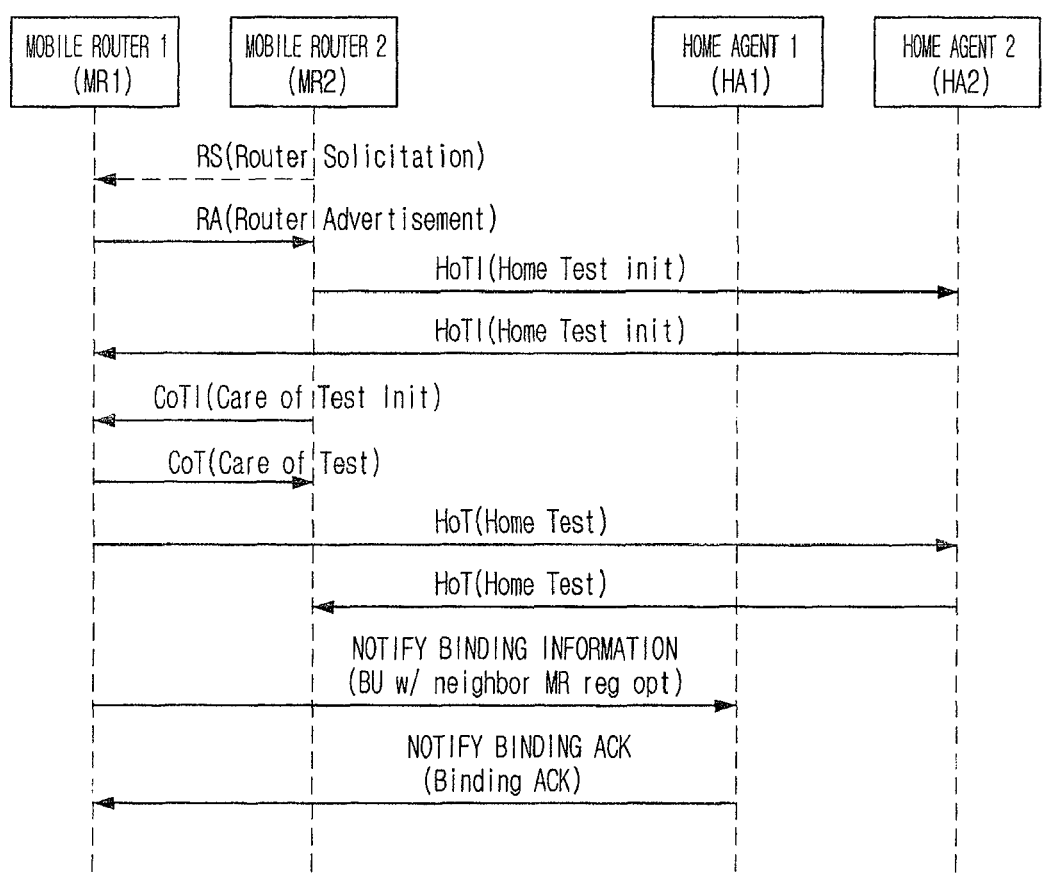
FIG. 1 is a flowchart illustrating a method for registering a peer mobile router in accordance with the related art.

The remarkable point of the PMR authentication method according to the present invention is to perform an authentication process based on a home agent (HA) that can provide stable services in a fixed location, not a mobile router that changes its location. Referring to FIG. 1 again, one mobile router (MR) authenticates another mobile router (MR) through a method for authenticating and registering the neighbor mobile routers according to the related art. However, since mobile routers are terminals having mobility, there are unstable elements in the RR authentication process (Home Test Init (HoTI), Care of Test Init (CoTI), Care of Test (CoT), and Home Test (HoT)) between the mobile routers due to mobility. Although the RR process can be applied to a terminal having mobility, more stable authentication services can be provided if a home agent, a fixed object, performs the RR process to a mobile router.

Therefore, in the peer mobile router authentication method according to an exemplary embodiment of the present invention, a mobile router does not register an authenticated neighbor mobile router as a backup mobile router in its home agent, but makes an equivalent relationship each other, so the authenticated neighbor mobile router is named a "peer mobile router (PMR)".

Figure 2:
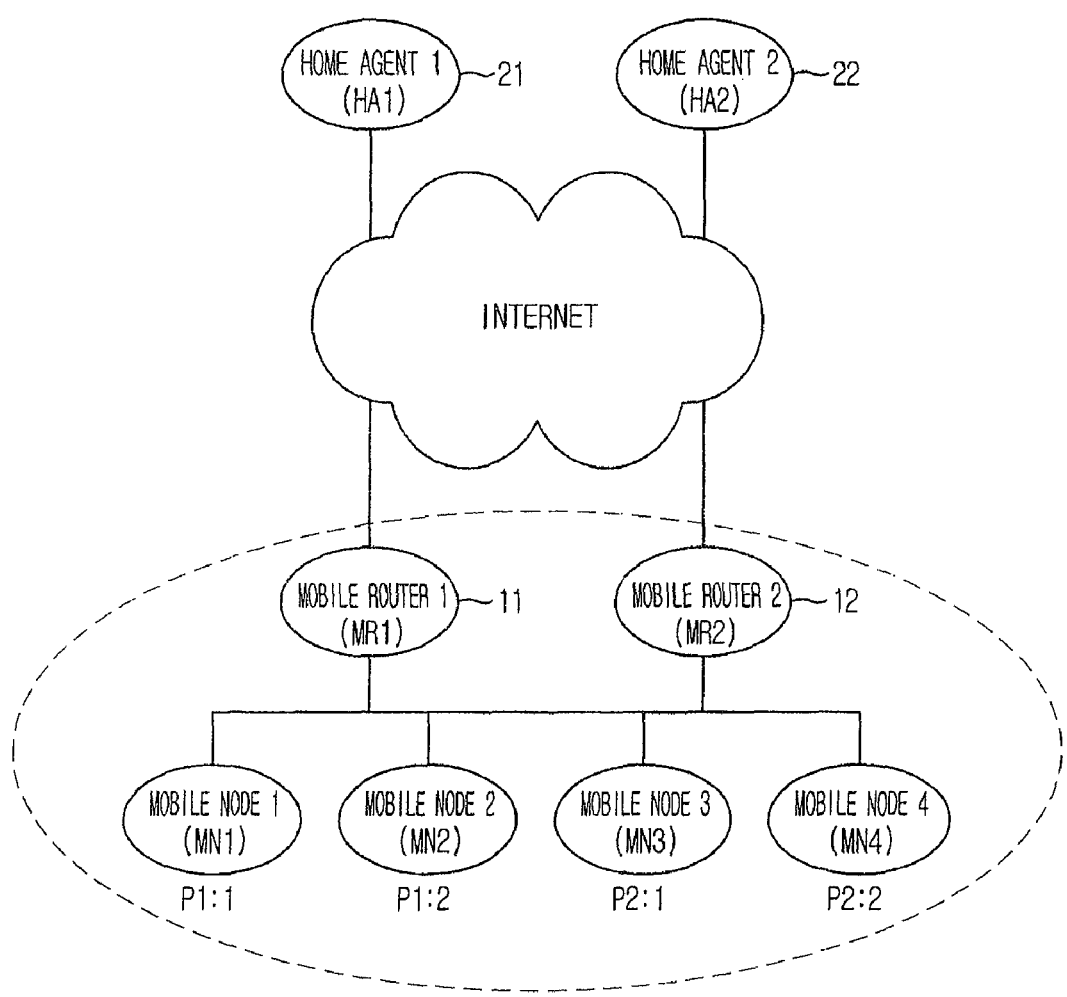
FIG. 2 is a diagram illustrating a multi-homing NEMO network in accordance with an embodiment of the present invention.

Now, in a multi-homing mobile network having two mobile routers (MR1 and MR2) 11 and 12 and two home agents (HA1 and HA2) 21 and 22 as shown in FIG. 2, a process that the MR1 11 performs to register the MR2 12 as a "PMR" will be described with reference to FIG. 3. Although the process that the MR1 11 performs to register the MR2 12 as a PMR will be described later, it can be understood the MR2 12 also can perform the same process to register the MR1 11 as a PMR.

Tunnels are provided between the MR1 11 and MR2 12 and the HA1 21 and HA2 22.

At first, the MR1 11 receives a router advertisement (RA) message from the MR2 12 through a router solicitation (RS) message and recognizes the fact that there is a mobile router, that is, a peer mobile router (PMR) to make a peer relationship with at step S301. Herein, the RS message can request the MR1 11 to receive the RA message of the MR2 12.

Then, the MR1 11 transmits a PMR request message (PMR Request) to the MR2 12 to make a peer relationship with the MR2 12 at step S302. At this time, the PMR request message is to request the MR2 22 sending the RA message to be the PMR of the MR1 11.

When receiving the PMR request message, the MR2 12 determines whether to accept the PMR request or not depending on its policy and current load, and transmits a PMR request reply message (PMR Reply) to the MR1 11 at step S303. At this time, if the S flag in the PMR request reply message is set to 1, it means that the MR2 12 accepts the request of the MR1 11. Otherwise, the S flag is set to 0, and it means the MR2 refuses to be the PMR of the MR1 11.

When receiving the PMR request reply message in which the S flag is set to 1, the MR1 11 sends a PMR authentication request message (PMR Authentication Request) to its home agent, HA1 21, to authenticate the candidate PMR, MR2 12, at step S304. At this time, the home address of the candidate PMR (MR2 12) is included in the PMR authentication request message.

Then, when receiving the PMR authentication request message, the HA1 21 sends a PMR registration request message (PMR Registration Request) to the home address of the candidate PMR (MR2 12) at step S305. At this time, the PMR registration request message includes the prefix of the MR1 11, which is required to indicate which mobile router requests the PMR registration.

Next, when receiving the PMR registration request message, the candidate PMR (MR2 12) performs a RR authentication process to the HA1 21 at steps S306 to S311.

In the RR authentication process, the candidate PMR (MR2 12) sends a HoTI message to the HA2 22 at step S306, and the HA2 22 sends the HoTI message to the HA1 21 of the MR1 11 at step S307. Then, the candidate PMR (MR2 12) sends a CoTI message to the HA1 21 of the MR1 11 at step S308, and receives a CoT message from the HA1 21 in response to the CoTI message at step S309. After sending the CoT message to the MR2 12, the HA1 21 sends a HoT message to the HA2 22 of the MR2 12 in response to the HoTI message at step S310. The HA2 22 sends the HoT message to the candidate PMR (MR2 12) at step S311, and the RR authentication process is completed.

When the RR authentication process is completed, the candidate PMR (MR2 12) sends a PMR registration reply message (PMR Registration Reply) to the HA1 21 to indicate the authentication is successful at step S312. At this time, the PMR registration reply message includes the prefix of the MR1 11 to indicate the MR2 12 will be the PMR thereof.

When receiving the PMR registration reply message, the HA1 21 sends a PMR authentication request reply message (PMR Authentication Reply) to the MR1 11 at step S313.

If the RR authentication process is completed successful, the MR2 12 adds the entry of its forwarding table as following table 1 (MR2 forwarding table). At this time, since a real tunnel between the MR2 22 and the HA1 21 does not exist, an active flag A is set to 0. If the MR1 11 fails later, the tunnel between the MR2 12 and the HA1 21 will be made, and the active flag A will be set to 1 when the MR2 12 provides services for the prefix of the MR1 11.

TABLE 1

| Source prefix | Tunnel ID | Active |
|---|---|---|
| P1 | TID1 | 1 |
| P2 | — | 0 |

The MR1 11 registers the MR2 12 as its PMR through the aforementioned process. Moreover, the MR2 12 can register the MR1 11 as its PMR through the same process.

The PMR request message at step S302 is a message that the MR1 11 requests the MR2 12 to be its PMR when receiving the RA message from the MR2 12. By repeating this process periodically, the PMR relationship can be maintained continuously.

When sending the PMR request message for the first time, the MR1 11 writes its home address as the source address and uses the home address of the MR2 12 as the destination address. Herein, the home address of the MR2 12 can be known from the RA message of the MR2 12. The packet format used for the PMR request message follows basically the IPv6 ICMP and is defined as follows.

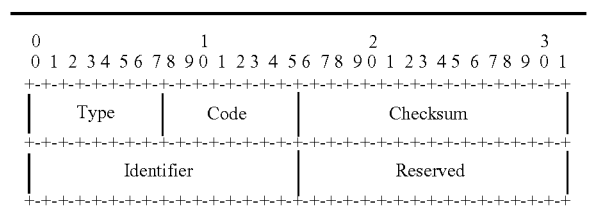

Type: 148
Code: 0
Checksum: the ICMP checksum
Identifier: ID to distinguish the PMR request message.
Reserved: This field is not used yet. It must be filled with zero to be sent.

The PMR request reply message (PMR Reply) is a reply message for the PMR request, and notifies the decision whether to accept the PMR request through the S flag. If receiving the message to accept the PMR request, that is the PMR request reply message, the MR1 11 sends the PMR authentication request message to its home agent, HA1 21, at step S304.

Herein, the packet format used for the PMR request reply message at step S303 follows basically the IPv6 ICMP and is defined as follows.

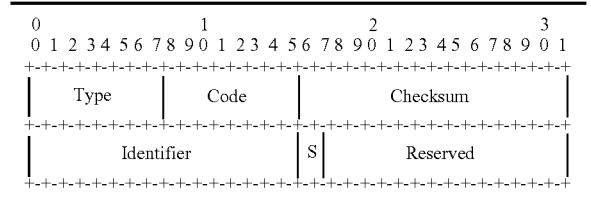

Type: 149
Code: 0
Checksum: the ICMP checksum
Identifier: ID to distinguish the PMR request reply message.
S: If the PMR request are accepted, it is set to 1, otherwise, set to 0.
Reserved: This field is not used yet. It must be filled with zero to be sent.

The PMR authentication request message at step S304 is used in order that the MR1 11 requests its home agent, HA1 21, to authenticate the candidate PMR when receiving the PMR request reply message successfully at step S303. This PMR authentication request message includes the home address of the candidate PMR, MR2 22, in order to perform the RR authentication process at steps S306 to S311.

Herein, the packet format used for the PMR authentication request message at step S304 follows basically the IPv6 ICMP and is defined as follows.

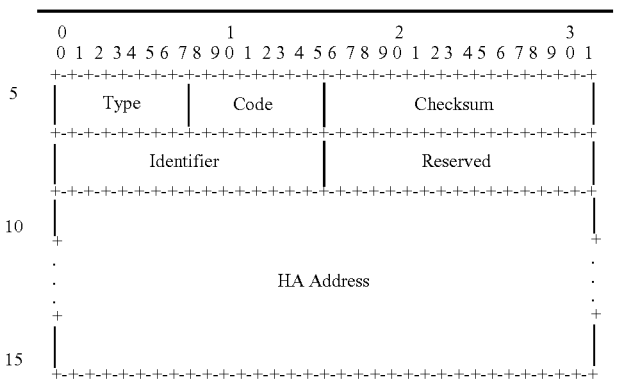

Type: 150
Code: 0
Checksum: the ICMP checksum
Identifier: An identifier to distinguish the PMR authentication request message.
Reserved: This field is not used yet. It must be filled with zero to be sent.
HA Address: The home address of the candidate mobile router that sent the PMR request reply message.

The PMR authentication request reply message (PMR Authentication Reply) at step S313 is a reply message for the PMR authentication request message at step S304. When receiving the PMR registration reply message at step S312 after the RR authentication, the HA1 21 uses the PMR authentication request reply message to inform the MR1 11 that the authentication is successful. In other words, since the HA1 21 performs the RR authentication process for the peer MR2 12 in response to the periodic request of the MR1 11, that is, the PMR authentication request message at step S304, the PMR authentication request reply message is sent to the MR1 11 that requested the RR authentication, that is, that sent the PMR authentication request message at step S304 whenever the authentication is successful through the RR authentication process at steps S306 to S311.

Herein, the packet format used for the PMR authentication request reply message at step S313 follows basically the IPv6 ICMP and is defined as follows.

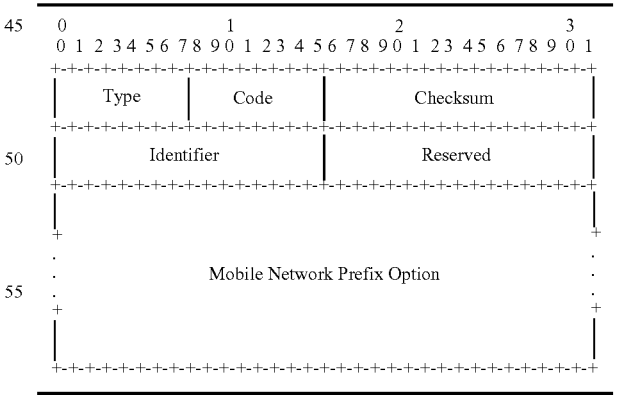

Type: 151
Code: 0
Checksum: the ICMP checksum
Identifier: An identifier to distinguish the PMR authentication request reply message.
Reserved: This field is not used yet. It must be filled with zero to be sent.
HA Address: The home address of the candidate mobile router that sent the PMR request reply message. It is the same as the home address of the mobile router of which the authentication is successful.

The PMR registration request message (PMR Registration Request) at step S305 is a message sent to the MR2 12 by the HA1 21 that received the PMR authentication request message of the MR1 11. The MR2 12 that received this message performs the RR authentication to the HA2 22. The PMR registration request message includes the prefix of the MR1 11 that sent the PMR authentication request message at step S304 so as to distinguish the authenticated peer MR2 12 by comparing with the prefix of the PMR registration request reply message that will be sent by the peer MR2 12 later. The PMR registration request message is sent periodically because the PMR authentication request message is received periodically.

Herein, the packet format used for the PMR registration request message at step S305 follows basically the IPv6 ICMP and is defined as follows.

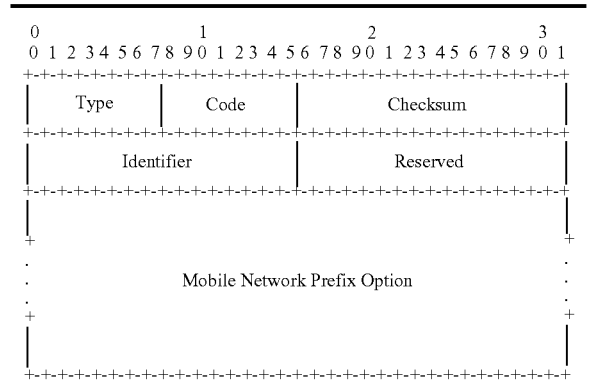

Type: 152
Code: 0
Checksum: the ICMP checksum
Identifier: An identifier to distinguish the PMR registration request message.
Reserved: This field is not used yet. It must be filled with zero to be sent.
Mobile Network Prefix Option: The prefix of the mobile router that sent the PMR authentication request message.

The PMR registration request reply message (PMR Registration Reply) at step S312 is a response message for the PMR registration request message at step S305. After the RR authentication, the MR2 12 sends this message to the HA1 221. The PMR registration request reply message includes the prefix of the MR1 11 so as to distinguish the MR1 11 for which the MR2 12 is registered as the PMR.

Whenever the PMR registration request message is received at step S305, the PMR registration request reply message is sent at step S312 after the RR authentication.

Herein, the packet format used for the PMR registration request reply message at step S312 follows basically the IPv6 ICMP and is defined as follows.

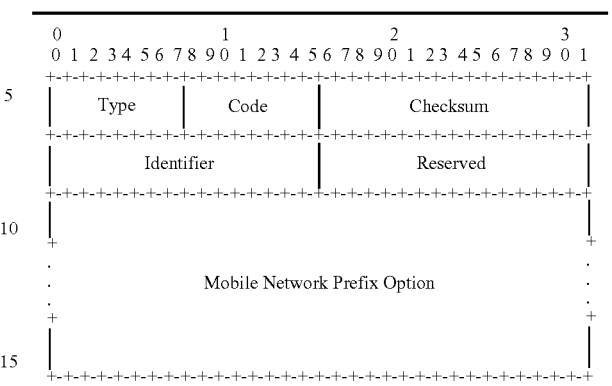

Type: 153
Code: 0
Checksum: the ICMP checksum
Identifier: An identifier to distinguish the PMR registration request reply message.
Reserved: This field is not used yet. It must be filled with zero to be sent.
Mobile Network Prefix Option: The prefix of the mobile router that sent the PMR authentication request message.

Hereinafter, a method for registering multiple CoAs for a NEMO network and a method for failover in accordance with an embodiment of the present invention will be described.

Figure 3:
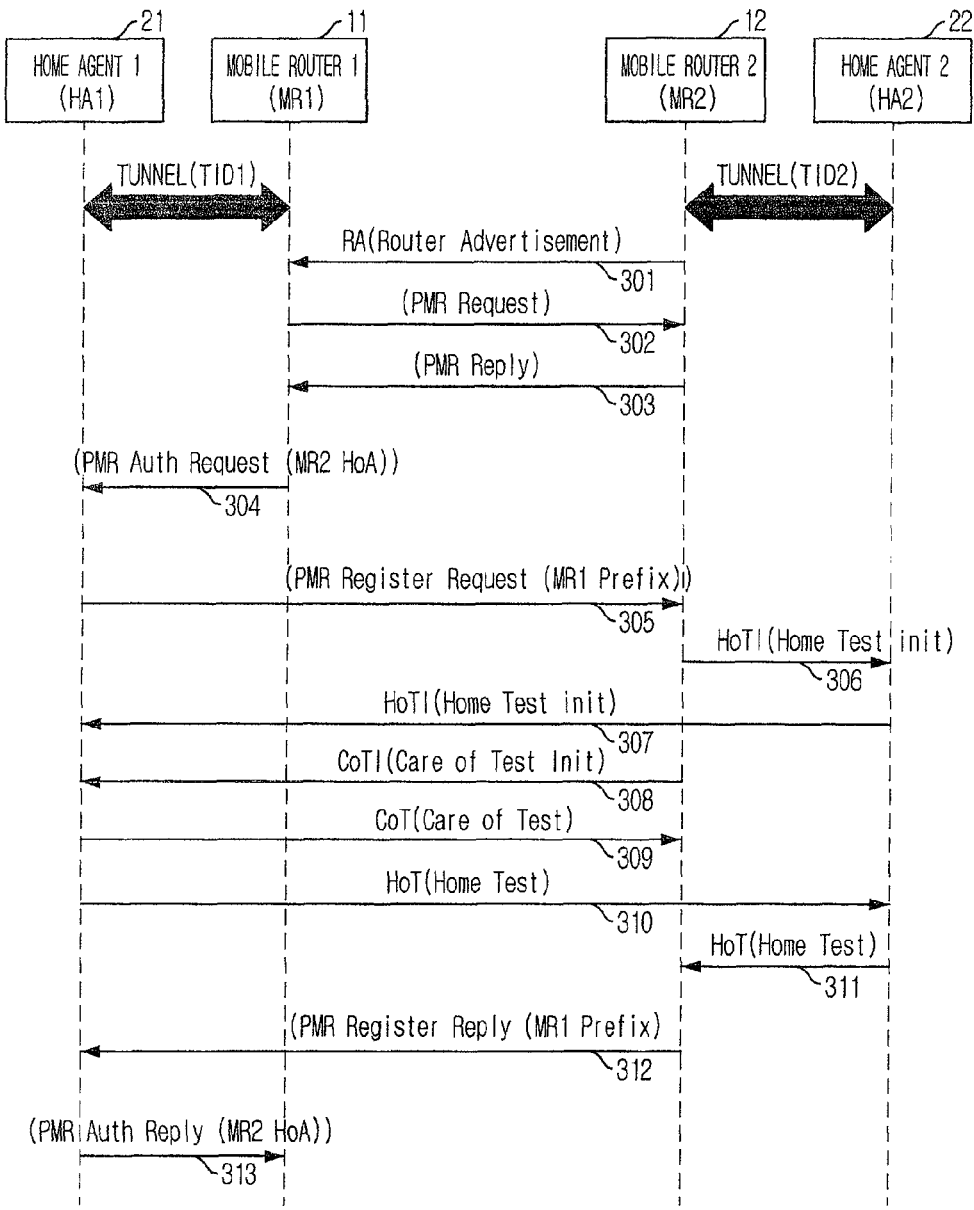
FIG. 3 is a flowchart illustrating a method for authenticating a mobile router in accordance with an embodiment of the present invention.

Although FIG. 3 shows that a MR1 11 registers a MR2 12 as a PMR, the MR1 11 is registered as the PRM of the MR2 12 hereinafter.

A method for registering multiple CoAs according to the present invention is developed by expanding a conventional method for registering multiple CoAs for mobile IPv6. That is, a mobile router is allowed to receive more that one of CoAs and to use multiple CoAs as like a mobile terminal. Additionally, a mobile router is allowed to register a peer mobile router's CoA to a home agent as one of the plurality of CoAs using the information of a peer mobile router PMR. Since the CoAs registering method according to the present invention is proposed to support the multi-homing of NEMO network, a CoA is registered only for the prefix of a mobile router (MR).

The CoA of a peer mobile router among multiple registered CoAs is used to provide seamless service although a mobile router becomes malfunctioned. In order to use the CoA of the peer mobile router, a primary CoA and a proxy CoA are identified. The primary CoA denotes a CoA of a mobile router belonging to a corresponding home agent (HA), and the proxy CoA represents the CoA of a peer mobile router among multiple registered CoA.

After the successful authentication of a peer mobile router, the MR2 12 registers the CoA of the MR1 11 to its HA2 22 as one of multiple registered CoAs. In this case, the registration is binding update for the prefix of a mobile router and uses a method for registering multiple CoAs for NEMO network.

In the CoAs registering method for supporting the multi-homing of NEMO network according to the present embodiment, a new flag is included in a binding update message to notice the first registration. That is, a backup flag (B) is included in a binding unique identifier sub-option message. If a currently updated CoA is a backup CoA, the backup flag is set to 1. Otherwise, the backup flag is set to 0. Also, a proxy flag P is added to a binding update message to denote that multiple CoAs are registered when multiple CoAs are registered.

Herein, when the MR2 12 successfully authenticates the MR1 11 and registers a backup CoA through proxy binding update, the binding cache of the HA2 22 is shown in below Table 2. In Table 2, P2 denotes a prefix managed by the MR2 12.

TABLE 2

|  | CoA | BID | Primary | Backup |
|---|---|---|---|---|
| HoA |  |  |  |  |
| MR2 HoA Prefix | MR2 CoA | 0 | 1 | 0 |
| P2 | MR2 CoA | 0 | 1 | 0 |
| Pit | MR1 CoA | 0 | 0 | 1 |

Hereinafter, a failover method for recovering a mobile router and distributing loads according to an embodiment of the present invention will be described.

At first, a failover method for Egress interface failure will be described with reference to FIGS. 4 and 5.

If an authentication request response message or a binding update response message is not arrived from a corresponding interface for a predetermined time, the MR2 12 determines that the egress interface is malfunctioned.

Figure 4:
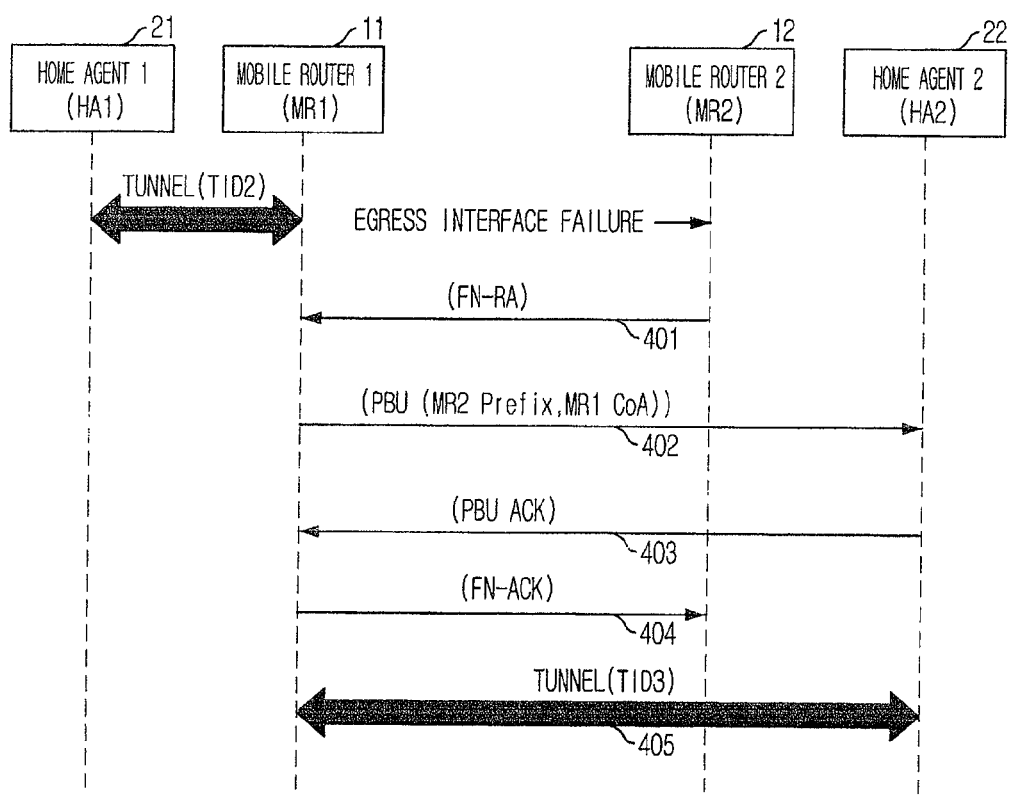
FIG. 4 is a flowchart illustrating an operating method for egress interface failure in accordance with an embodiment of the present invention.
Figure 5:
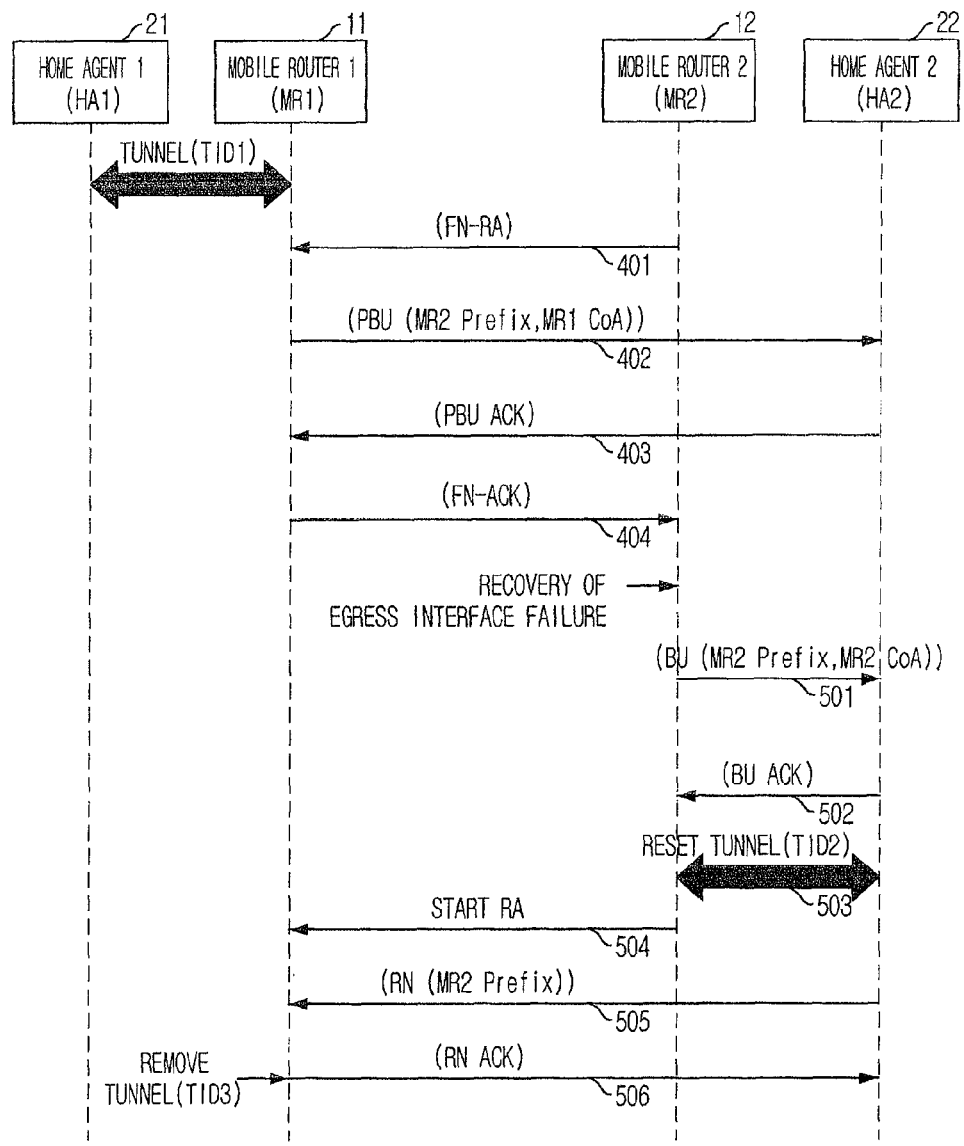
FIG. 5 is a flowchart illustrating a failover method for egress interface failure in accordance with an embodiment of the present invention.

When all of egress interfaces are failure, a corresponding MR2 12 notices the failure of the egress interfaces to the peer mobile router, the MR1 11, through a router advertisement message as a Failure Notify Router Advertisement (FN-RA) message at step S401 as shown in FIG. 4.

After the MR1 11 receives the FN-RA message, if the MR1 11 is capable of providing a proxy service, the MR1 11 transmits a proxy binding update (PBU) message to the HA2 22 of the MR2 12 at step S402.

As described above, the information of the malfunctioned primary CoA is updated in the binding cache of the HA2 22 of the MR2 12 having the interface failure. That is, the entry that was set as the current primary is updated as 0, and the primary of the entry of the current PUB among proxy CoAs with 0 primary is updated as 1 in order to use a corresponding backup CoA.

If the MR1 receives PBUs from multiple mobile routers, it is possible to distribute load based on a pre-defined policy.

After updating the binding cache, the HA2 22 transmits a PBU ACK message to the MR1 11 that transmits the PUB 11 at step S403. The peer MR1 11 receiving the PUB ACK message notifies not only an own prefix but also the prefix of the malfunctioned mobile router, the MR2 12.

Mobile nodes receiving services from the malfunctioned MR2 12 transmit packets to the peer MR1 11 that functions as the proxy of the malfunctioned MR2 12 according to the PUB ACK message. Then, the peer MR1 11 notifies that the peer MR1 11 provides a proxy service to the malfunctioned MR2 12 through a FN-ACK message at step S404, and the malfunctioned MR2 12 no longer transmits a RA message.

Afterward, the MR1 11 that functions as a proxy router creates a tunnel TID3 to the HA2 22 of the malfunctioned MR2 12 at step S405, and sets an active flag of corresponding entry in a forwarding table to 1 so as to provide a service for the prefix of the malfunctioned MR2 12.

For example, it assumes that three routers MR1, MR2, and MR3 are connected through peering relation.

Table 3 and Table 4 show the forwarding table of the MR1 and the binding cache of the HA2 before failure.

TABLE 3

| Source prefix | Tunnel ID | Active |
|---|---|---|
| P1 | TID1 | 1 |
| P2 | — | 0 |
| P3 | — | 0 |

TABLE 4

|  | CoA | BID | Primary | Backup |
|---|---|---|---|---|
| HoA |  |  |  |  |
| MR2 HoA Prefix | MR2 CoA | 0 | 1 | 0 |
| P2 | MR2 CoA | 0 | 1 | 0 |
| P2 | MR1 CoA | 0 | 0 | 1 |
| P2 | MR3 CoA | 0 | 0 | 1 |

If the egress interface of the MR2 is fail, the MR2 notices the MR1 and the MR3 with the failure of the MR2 through a FN-RA message at step S401. After the MR1 and the MR3 receive the FN-RA message, the MR1 and the MR3 transmit a PUB message to the HA2 of the MR2 at step S402 so that the binding cache of the HA2 is updated as shown in Table 5.

TABLE 5

|  | CoA | BID | Primary | Backup |
|---|---|---|---|---|
| HoA |  |  |  |  |
| MK2 HoA Prefix | MR2 CoA | 0 | 1 | 0 |
| P2 | MR2 CoA | 0 | 0 | 0 |
| P2 | MR1 CoA | 0 | 1 | 1 |
| P2 | MR3 CoA | 0 | 1 | 1 |

Afterward, the peer MR1 and MR3 create a tunnel to the HA2 at step S405. As a result, network nodes receiving a service through a MR2-HA2 tunnel can receive a service through the created tunnel between the peer MR3 and the HA2 or between the peer MR1 and the HA2. Herein, the peer MR1 and MR3 have any difficulty because the peer MR1 and MR3 receive the RR authentication from the HA2 through the previous peer MR authentication.

Herein, the MR2 receives a FN-ACK message from the MR1 and MR3 to notify that the proxy service is provided from the MR1 and the MR3 at step S404. Then, the MR2 does not transmit a RA message for own prefix. At this time, the forwarding table of MR1 is updated as shown in Table 6.

TABLE 6

| Source prefix | Tunnel ID | Active |
|---|---|---|
| P1 | TID1 | 1 |
| P2 | TID3 | 1 |
| P3 | — | 0 |

Meanwhile, when the egress interface is recovered, the MR2 12 transmits a BU message to the own HA2 22 at step S501.

After the HA2 receives the BU message, the HA2 22 recognizes that the MR2 is recovered and transmits a BU-ACK message to the MR2 12 at step S502. Then, the HA2 22 re-establishes a tunnel to the MR2 12 at step S503 and notices the peer mobile routers, for example, the MR1 11, with that the MR2 12 is recovered from the egress interface failure through a recovery notify (RN) message at step S505.

After the MR2 12 receives the BU-ACK message, the MR2 12 begins transmitting the RA message for own prefix to the MR1 11 at step S504. The MR1 11 receives the RA message and stops transmitting the RA message for a corresponding prefix. At this time, the tunnel TID3 between the MR 11 and the HA2 22 is deleted, and the active flag of the forwarding table is set to 0. Then, the RN-ACK message is transmitted to the HA2 22 at step S506.

For example, it assumes that three mobile routers MR1, MR2 and MR3 are connected as a peering relation and the egress interface of the MR2 is fail.

After recovering from failure, the MR2 performs a BU procedure to the HA2 at step S501, and the HA2 receiving the BU message transmits a RN message to the peer MR3 at step S505.

Herein, the MR2 receiving the BU-ACK message at step S502 restarts to transmit the RA message for the own prefix to the MR2 at step S504. The peer MR1 receiving the RN message from the HA2 stops transmitting the RA message for the prefix of the MR2 and deletes the corresponding tunnel formed with the HA2. Then, the RN-ACK message is transmitted to the HA2 at step S506.

The binding cache of the HA2 is updated as shown in Table 7. That is, primary:1 and backup:1 of MR1 CoA and MR3 CoA change primary:0 and backup:0, and primary:0 and backup:0 of MR2 CoA changes to primary:1 and backup:0. As a result, the service is re-provided.

TABLE 7

|  | CoA | BID | Primary | Backup |
|---|---|---|---|---|
| HoA |  |  |  |  |
| MR2 HoA Prefix | MR2 CoA | 0 | 0 | 0 |
| P2 | MR2 CoA | 0 | 1 | 0 |
| P2 | MR1 CoA | 0 | 0 | 1 |
| P2 | MR3 CoA | 0 | 0 | 1 |

Herein, the forwarding table of the peer MR1 is updated as shown in Table 8.

TABLE 8

| Source prefix | Tunnel ID | Active |
|---|---|---|
| P1 | TID1 | 1 |
| P2 | — | 0 |
| P3 | — | 0 |

When the egress interface is fail, the failure notify RA (FN-RA) message 401 adds a failure flag E to a RA message to notify the egress interface failure to the peer MR1. That is, the RA message with the failure flag E set denotes that own egress interface is fail.

After the peer MR1 receives the RA message with the failure flag E set, the peer MR1 transmits a PBU message to the HA2 of the malfunctioned MR2 if the peer MR1 is capable of providing a proxy service in consideration of own load and the peer MR1 receives the PBU-ACK message from the HA2. Then, the peer MR1 transmits the prefix of the malfunctioned MR2 through own RA message. Also, the peer MR1 transmits the FN-ACK message to the malfunctioned MR2 to notify that the peer MR1 provides the proxy service.

The FN-RA message 401 is identical to the typical RA message but includes an E flag to notice the interface failure. Herein, a used packet is defined as shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
| Cur Hop Limit |M|O|H|E| R     |       Router Lifetime         |
+-+-+-+-+-+-+-+-+-+-+-+-+-+-+-+-+-+-+-+-+-+-+-+-+-+-+-+-+-+-+-+-+
|                        Reachable Time                         |
+-+-+-+-+-+-+-+-+-+-+-+-+-+-+-+-+-+-+-+-+-+-+-+-+-+-+-+-+-+-+-+-+
|                         Retrans Timer                         |
+-+-+-+-+-+-+-+-+-+-+-+-+-+-+-+-+-+-+-+-+-+-+-+-+-+-+-+-+-+-+-+-+
|   Options ...
+-+-+-+-+-+-+-+-+-+-+-+-
```

E (Egress Interface Error)

When an egress interface error is arisen, the flag E is set to 1 to notice a peer mobile router with failure. If the egress interface error is not arisen, the flag E is set to 0. At this time, the FN-RN message is identical to the typical RA message.

Also, the FN-ACK message 404 is a message that is transmitted to the malfunctioned MR2 when a proxy service is provided through a PBU-ACK message. The MR2 receiving the FN-ACK message no longer transmits the RA message for own prefix. Accordingly, the packet is basically defined based on IPv6 ICMP as shown below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |          Checksum             |
+-+-+-+-+-+-+-+-+-+-+-+-+-+-+-+-+-+-+-+-+-+-+-+-+-+-+-+-+-+-+-+-+
|          Identifier           |           Reserved            |
+-+-+-+-+-+-+-+-+-+-+-+-+-+-+-+-+-+-+-+-+-+-+-+-+-+-+-+-+-+-+-+-+
|                                                               |
+                                                               +
.                                                               .
.                          HA Address                           .
+                                                               +
|                                                               |
+-+-+-+-+-+-+-+-+-+-+-+-+-+-+-+-+-+-+-+-+-+-+-+-+-+-+-+-+-+-+-+-+
``` type: 155
Code: 0
Checksum: ICMP checksum
Identifier: ID for identifying FN-RN message
Reserved: not used yet, filled with 0
HA address: address of HA of malfunctioned mobile router Also, the proxy binding update (PBU) message 402 is a typical binding update message with a proxy flag inserted.

In the method according to the present embodiment, the CoA of the peer MR1 is updated to a backup CoA, and it is always updated only for prefix. Also, it is possible to a proxy binding update message to the HA of a peer mobile router as well as the own HA instead of the peer mobile router. At this time, the proxy flag of the PBU message is set to 1. Also, the mobile router flag R among mobile options is always set to 1.

The packet of the PBU message is defined as follow.

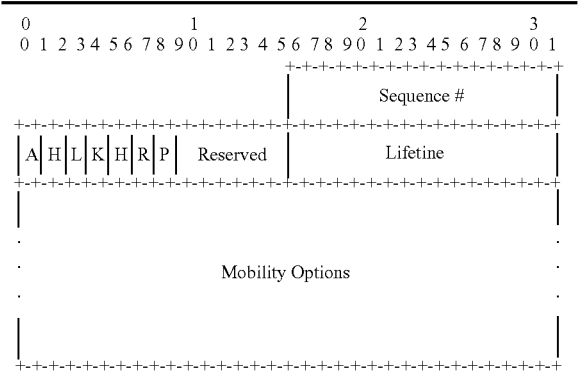

P: 1 if a mobile router for binding update is a peer mobile router, otherwise 0

Also, the packet of the PBU-ACK message is defined as follow.

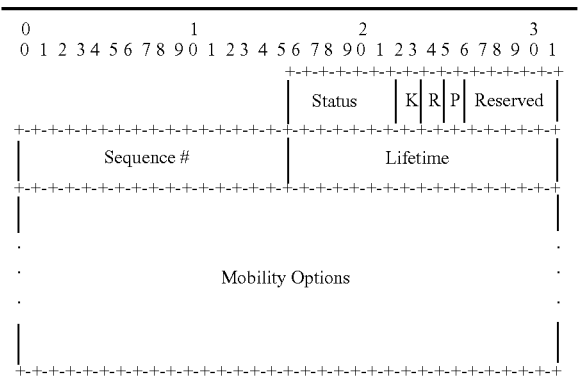

P: 1 if a mobile router for binding update is a peer mobile router, otherwise 0

Also, a binding unique identifier sub-option message for registering multiple CoAs includes a backup flag B to identify a backup CoA. If the backup flag is set to 1, the backup CoA is registered as primary:0 and backup:1 in the binding cache of a home agent (HA). If the backup flag is set to 0, the backup CoA is registered as primary:1 and backup:0 in the binding cache of a home agent (HA). The packet of the binding unique identifier sub-option message is defined as follow.

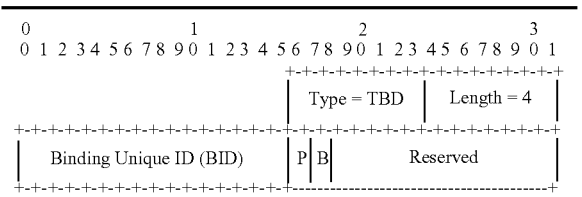

B: 1 if the CoA of a peer mobile router is registered as a backup CoA among multiple CoAs, otherwise 0

Although the packet format of the BU message 501 is identical to the proxy binding update (PBU) message, the HA differently processes the BU message when the HA receives the BU message. That is, since it is a case of receiving a binding update message for a CoA set as primary:0 and backup:0 in a current binding cache, the HA recognizes that the BA message is transmitted after a malfunctioned MR is recovered. Therefore, the HA updates the own binding cache and notices the peer mobile router that the mobile router is recovered through a RN message.

Also, the RN message 505 is a message for the HA to notice the peer router that the own mobile router is recovered. That is, if the HA receives a binding update message from a peer mobile router, the HA transmits a RN message to peer mobile routers having an entry with primary:1 and proxy:1 in the binding cache of the HA. The peer mobile router having the RN message stops transmitting a RA message corresponding to the prefix of a recovered mobile router. The packet of the RN message is defined based on IPv6 ICMP as follow.

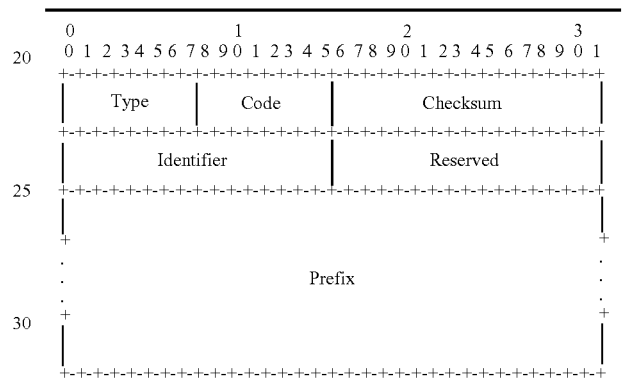

type: 156
code: 0
Checksum: ICMP checksum
Identifier: ID for identifying a RN message
Reserved: non used region, filled with 0
Prefix: denotes prefix information of recovered mobile router. A mobile router receiving this message stops transmitting a RA message for corresponding prefix Also, the RN-ACK message 506 is used for notifying that a peer mobile router successfully receives a RN message. The packet of the RN-ACK message is basically defined by IPv6 ICMP as follow.

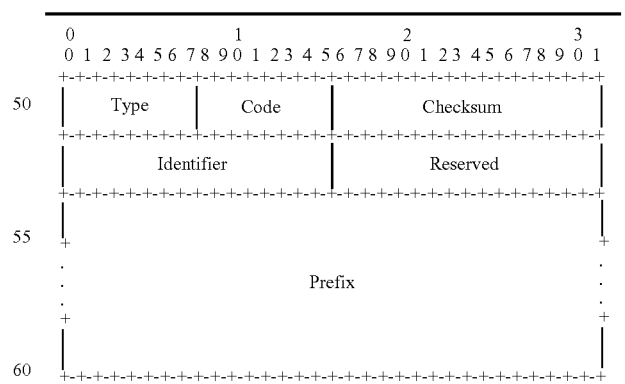

type: 157
code: 0
Checksum: ICMP checksum
Identifier: ID for identifying a RN message
Reserved: non used region, filled with 0
Prefix: denotes prefix information of recovered mobile router.

Figure 6:
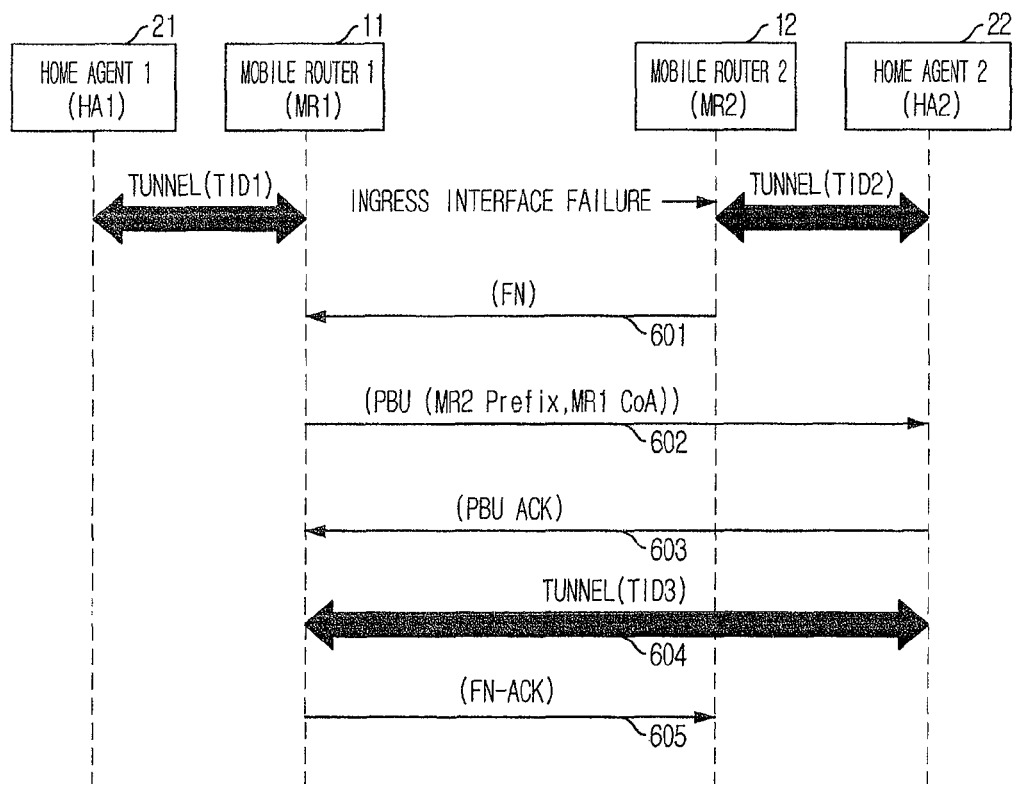
FIG. 6 is a flowchart illustrating an operating method for ingress interface failure in accordance with an embodiment of the present invention.

Hereinafter, a failover method for an ingress interface failure will be described with reference to FIGS. 6 and 7.

Differently from the egress interface failure, if an ingress interface is fail, the MR2 12 cannot notice the peer MR1 11 with the ingress interface failure through the own RA message. Therefore, the MR2 12 notifies the ingress interface failure through the Internet as like other data packets. The HA2 22 of the malfunctioned MR2 12 can recognize the CoA of own peer MR1 11 because the HA2 22 regularly transmits a peer authentication response message to the MR2 12 through RR authentication. Therefore, the malfunctioned MR2 12 uses the CoA of peer MR1 11, recognized by the HA2 22, to notify the ingress interface failure through a failure notify (FN) message at step S601. Since the MR2 has the ingress interface failure, the FN message is transmitted through the MR2's HA2 22.

As described above, the information about the currently malfunctioned primary CoA is updated at the binding cache of the HA2 22 of the malfunctioned MR2 12 using the PBU.

If the PBUs are received from multiple mobile routers, it is possible to distribute the load according to a pre-given policy.

After updating the binding cache as described above, the HA2 22 transmits a PBU-ACK message to the peer MR1 11 that transmits the PUB at step S603. Then, the MR1 11 functioning as the proxy creates a tunnel TID3 with the HA2 22 of the malfunctioned MR2 12 at step S604 and notifies the malfunctioned MR2 12 that the MR1 11 provides a proxy service through a FN-ACK message at step S605. Accordingly, the malfunctioned MR2 12 no longer transmits a FN message.

As described above, if the ingress interface of the MR2 12 is failed, the forwarding table of the peer MR1 11 is updated as shown in Table 9.

TABLE 9

| Source prefix | Tunnel ID | Active |
|---|---|---|
| P1 | TID1 | 1 |
| P2 | — | 0 |
| P3 | — | 0 |

Figure 7:
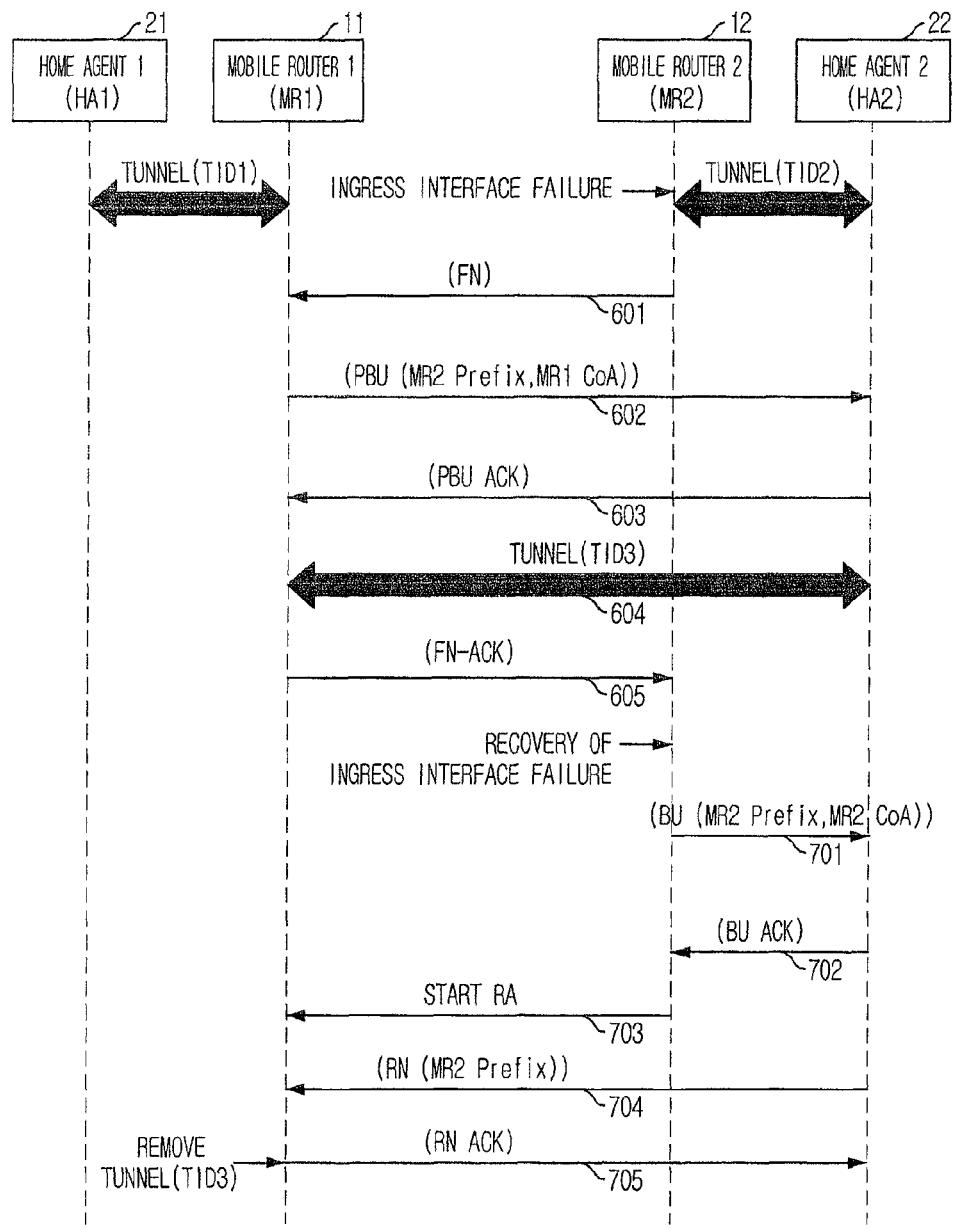
FIG. 7 is a flowchart illustrating a failover method for ingress interface failure in accordance with an embodiment of the present invention.

Meanwhile, if the ingress interface is recovered, the MR2 12 transmits a binding update (BU) message to own HA2 22 at step S701 as shown in FIG. 7.

After the HA2 22 receives the BU message, the HA2 22 notifies that the MR2 12 is recovered from the ingress interface failure and transmits a BU-ACK message to the MR2 12 at step S702. Then, the HA2 22 notifies the peer mobile routers, that is, the MR1 11, that the malfunctioned h a MR2 12 is recovered from the ingress interface failure through a RN message at step S704.

After the MR2 12 receives the BU-ACK message, the MR2 12 begins transmitting a RA message for own prefix to the MR1 11 at step S703, and the MR1 11 receiving the RN message stops transmitting a RA message for corresponding prefix. Herein, the tunnel TID3 between the MR1 11 and the HA2 22 is deleted, and the RN-ACK message is transmitted to HA2 22 at step S705.

When the ingress interface failure of the MR2 12 is recovered, the forwarding table of the peer MR1 11 is updated as shown in Table 10.

TABLE 10

| Source prefix | Tunnel ID | Active |
|---|---|---|
| P1 | TID1 | 1 |
| P2 | TID3 | 1 |
| P3 | — | 0 |

The failure notify router (FN) message 601 is a message for notifying an ingress interface failure to peer mobile routers. Since the CoA of the peer mobile router can be recognized through the peer authentication response message regularly transmitted from own home agent (HA), the CoA recognized from the HA is used to notify the ingress interface failure when the ingress interface is failed.

After the peer mobile router receives the FN message, the peer mobile router performs identical operations compared to those performed for the egress interface failure. Herein, the FN-ACK message is transmitted through the HA of the recovered mobile router due to the ingress interface failure. The packet of the FN message is defined basically by IPv6 ICMP as follow.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |     Code      |           Checksum            |
+-+-+-+-+-+-+-+-+-+-+-+-+-+-+-+-+-+-+-+-+-+-+-+-+-+-+-+-+-+-+-+-+
|           Identifier          |           Reserved            |
+-+-+-+-+-+-+-+-+-+-+-+-+-+-+-+-+-+-+-+-+-+-+-+-+-+-+-+-+-+-+-+-+
|                                                               |
+                                                               +
.                                                               .
.                          HA Address                           .
+                                                               +
|                                                               |
+-+-+-+-+-+-+-+-+-+-+-+-+-+-+-+-+-+-+-+-+-+-+-+-+-+-+-+-+-+-+-+-+
``` type: 154
code: 0
checksum: ICMP checksum
Identifier: ID for identifying a FN message
Reserved: non used yet, filled with 0
HA address: address of HA of malfunctioned mobile router Also, the FN-ACK message 605 is a message transmitted to a malfunctioned mobile router as a response for a FN message. The mobile router receiving the FN message no longer transmits the FN message. The packet format of the FN-ACK message is identical to the FN-ACK message, and a mobile router receiving the FN-ACK message performs appropriate operations.

Figure 8:
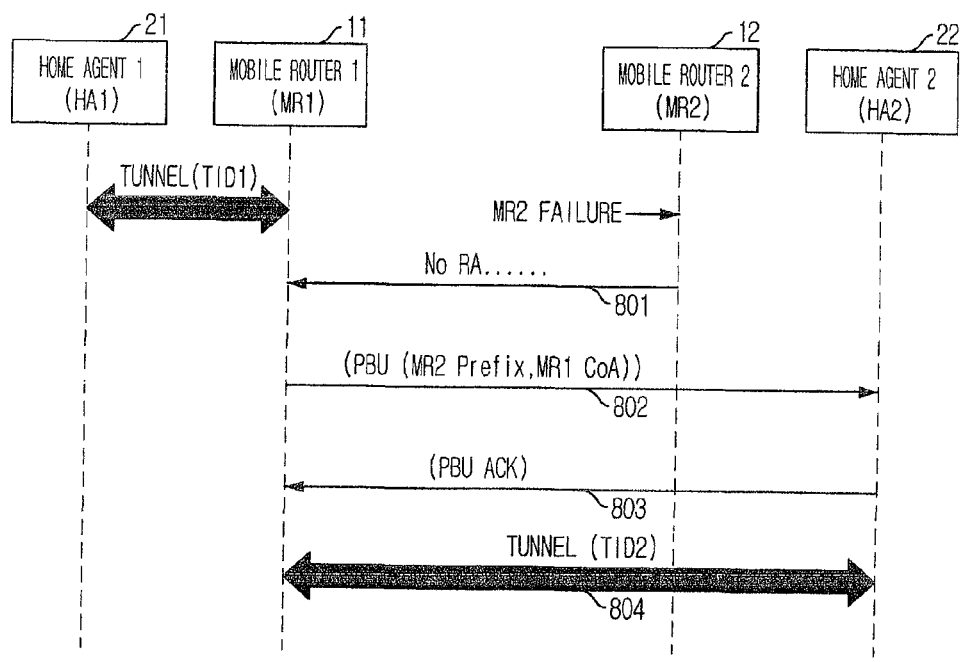
FIG. 8 is a flowchart illustrating an operating method for mobile router failure in accordance with an embodiment of the present invention.
Figure 9:
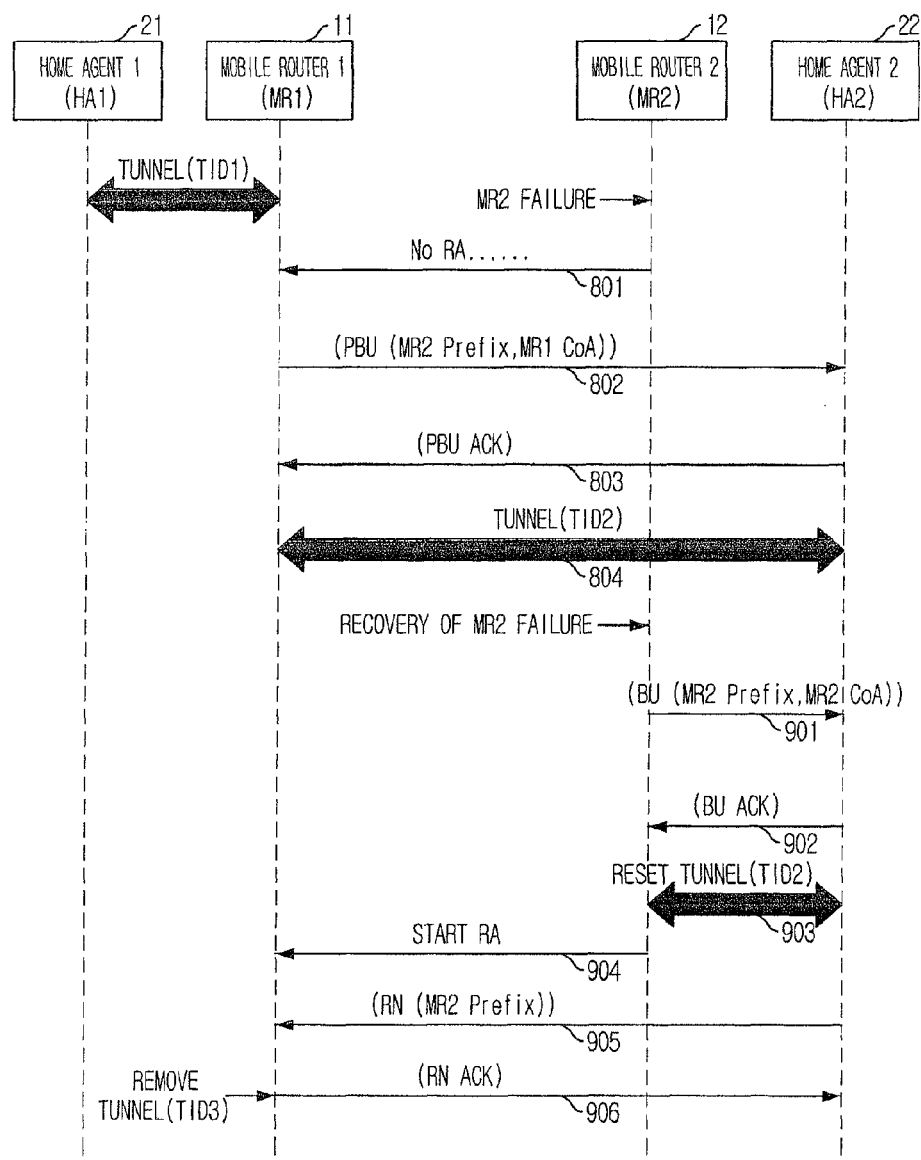
FIG. 9 is a flowchart illustrating a failover method for mobile router failure in accordance with an embodiment of the present invention.

Hereinafter, a failover and recovery method for the failure of a mobile router including all of ingress and egress interface failure will be described with reference to FIGS. 8 and 9.

If the MR1 11 does not receive a RA message from the MR2 12 which is in a peering relation with the MR1 11 for a predetermined time at step S801, the MR1 11 transmits a message for a non-exist port to the CoA of the MR2 12. If the MR1 11 receives an 'ICMP host unreachable message' from the MR2 12, the MR1 11 transmits a PBU message to the HA2 22 of the MR2 12 at step S802. Afterward, the MR1 11 performs identical operations compared to cases of the ingress interface failure and the egress interface failure excepting not transmitting the FN-ACK message because the MR1 11 does not receive the FN-ACK message from the malfunctioned MR2 12.

That is, the peer MR1 11 transmits a PBU message to the HA2 22 of the malfunctioned MR2 12 at step S802, and the information of the currently failed primary CoA is updated to the binding cache of the HA2 22 of the MR2 12 based on the PBU. The HA2 22 transmits a PBU-ACK message to the MR1 11 that transmits the PBU message at step S803, and the MR1 11 functioning as a proxy creates a tunnel between the malfunctioned MR2 12 and the HA2 22 at step S804.

When the ingress or the egress interface of the MR2 12 is failed, the forwarding table of the peer MR1 11 is updated as shown in Table 11.

TABLE 11

| Source prefix | Tunnel ID | Active |
| --- | --- | --- |
| P1 | TID1 | 1 |
| P2 | TID3 | 1 |
| P3 | — | 0 |

Meanwhile, if the ingress or the egress interface failure is recovered, the corresponding MR2 12 transmits a BU message to the own HA2 22 at step S901.

Then, the HA2 22 receiving the BU message recognizes that the MR2 12 is recovered from the failure and transmits the BU-ACK message to the MR2 12 at step S902. Then, the HA2 22 re-establishes the tunnel to the MR2 12 at step S903, and notifies peer mobile routers, for example, the MR1 11, that the MR2 12 is recovered from the failure through a RN message at step S905.

Herein, the MR2 12 receiving the BU-ACK message begins transmitting a RA message for own prefix to the MR1 11 at step S904, and the MR1 11 receiving the RN message stops transmitting a RA message for corresponding prefix. Herein, the previously established tunnel TID3 between the MR1 11 and the HA2 22 is deleted, and the RN-ACK message is transmitted to the HA2 22 at step S906.

If the ingress and the egress interface failure of the MR2 12 are recovered, the forwarding table of the MR1 11 is updated as shown table 12.

TABLE 12

| Source prefix | Tunnel ID | Active |
| --- | --- | --- |
| P1 | TID1 | 1 |
| P2 | — | 0 |
| P3 | — | 0 |

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

While the present invention has been described with respect to certain preferred embodiments, it will be apparent to those skilled in the art that various changes and modifications may be made without departing from the scope of the invention as defined in the following claims.

What is claimed is:

1. A method for registering a mobile router (MR) in a multi-homing Network Mobility (NEMO) network system including multiple mobile routers, the method comprising the steps of:

a) at a first MR, identifying a second MR that allows a peering relation to the first MR;
b) at the first MR, transmitting a peer request message to the second MR for making a peer relation with the second MR;
c) at the first MR, requesting a home agent (HA) of the first MR to authenticate the second MR in response to a peer request response from the second MR;
d) at the HA, transmitting a peer mobile router registering request message to the second MR with a prefix of the first MR that transmitted the authentication request message to perform return routability (RR) authentication; and
e) at the HA, notifying the authentication result of the second MR to the first MR when receiving a RR authentication result message including the prefix of the first MR to be registered as a peer from the second MR, where the RR authentication result message is a peer mobile router registering request response message.

2. The method as recited in claim 1, further comprising the step of, at the second MR, adding a forwarding table entry for the HA when the authentication is successful.

3. The method as recited in claim 2, wherein in the forwarding table entry, an active flag A is set to 0 because a tunnel between the second MR and the HA is not present, a tunnel between the second MR and the HA is created when the first MR malfunctions, and the active flag is set to 1 when the second MR provides a service for a prefix of the first MR.

4. The method as recited in claim 1, wherein the first MR uses an own home address as a source address when transmitting the peer request message, and uses a home address of the second MR receiving the peer request message as a destination address.

5. The method as recited in claim 4, wherein the home address of the second MR receiving the peer request is learned from a router advertisement (RA) message of the second MR.

6. The method as recited in claim 5, wherein the peer request message is a message for requesting the second MR that receives the RA message from the first MR to be a peer mobile router.

7. The method as recited in claim 4, wherein the second MR determines whether the peer request is accepted or not according to the second MR's policy and current load when receiving the peer requesting message.

8. The method as recited in claim 7, wherein the first MR transmits the authentication request message with a home address of the second MR included to the HA for authenticating the second MR when receiving the peer request response message, where the authentication request message is a peer mobile router authentication request message, and the HA transmits the peer mobile router registering request message with the prefix of the first MR to the home address of the second MR to perform the RR authentication.

9. The method as recited in claim 4, wherein the peer mobile router registering request message is for identifying an authenticated MR as a peer in correspondence to the prefix of the first MR included in the peer mobile router registering request response message transmitted from the second MR by transmitting the authentication request message with the prefix of the first MR included, where the authentication request message is a peer mobile router authentication request message.

10. A method for registering multiple Care-of Addresses (CoAs) of a first MR which is authenticated by a method of authenticating a peer mobile router (MR), where the method of authenticating a peer MR comprising the steps of:

a) at a first MR, identifying a second MR that allows a peering relation to the first MR;
b) at the first MR, transmitting a peer request message to the second MR for making a peer relation with the second MR;
c) at the first MR, requesting a home agent (HA) of the first MR to authenticate the second MR in response to a peer request response from the second MR;
d) at the HA, transmitting a peer mobile router registering request message to the second MR with a prefix of the first MR that transmitted the authentication request message to perform return routability (RR) authentication; and
e) at the HA, notifying the authentication result of the second MR to the first MR when receiving a RR authentication result message including the prefix of the first MR to be registered as a peer from the second MR, where the RR authentication result message is a peer mobile router registering request response message, wherein the second MR registers a CoA of the first MR to a home agent of the second MR as one of multiple CoAs using information of the first MR which is a peer router of the second MR, but registers a CoA only for a prefix of the first MR.

11. The method as recited in claim 10, wherein the second MR successfully authenticates the first MR as a peer mobile router and registers a backup CoA through a proxy binding update message.

12. The method as recited in claim 10, wherein the CoA of the first MR, which is registered as one of multiple CoAs is used, for providing seamless services when the second MR malfunctions, and a primary CoA and a proxy CoA are distinguished, where the primary CoA denotes a CoA of the second MR belonging to a corresponding HA, and the proxy CoA registers the CoA of the first MR as one of multiple CoAs.

* * * * *